(12) United States Patent
Verma et al.

(10) Patent No.: US 11,095,605 B1
(45) Date of Patent: Aug. 17, 2021

(54) REQUEST ROUTING UTILIZING ENCODED DNS-BASED MESSAGING PARAMETERS

(71) Applicant: Amazon Technologies, Inc., Seattle, WA (US)

(72) Inventors: Prashant Verma, Seattle, WA (US); Ronil Sudhir Mokashi, Mercer Island, WA (US); Karthik Uthaman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/583,718

(22) Filed: Sep. 26, 2019

(51) Int. Cl.
*H04L 29/12* (2006.01)
*H04L 29/06* (2006.01)
*H04L 29/08* (2006.01)

(52) U.S. Cl.
CPC ...... *H04L 61/1511* (2013.01); *H04L 65/4084* (2013.01); *H04L 67/24* (2013.01); *H04L 67/2842* (2013.01)

(58) Field of Classification Search
CPC ............... G06F 16/9574; H04L 47/823; H04L 67/1002; H04L 67/2847; H04L 67/289; H04L 67/32; H04L 67/2842; H04L 67/1036; H04L 67/101; H04L 61/1511; H04N 21/25
USPC ........................................................ 709/217
See application file for complete search history.

(56) References Cited

U.S. PATENT DOCUMENTS

| | | | |
|---|---|---|---|
| 2011/0040870 A1* | 2/2011 | Wynn | H04W 4/029 709/224 |
| 2013/0212300 A1* | 8/2013 | Eggleston | H04L 61/2007 709/245 |
| 2016/0301598 A1* | 10/2016 | Strijkers | H04L 12/66 |
| 2018/0367498 A1* | 12/2018 | Bliss | H04L 61/1511 |

* cited by examiner

*Primary Examiner* — Tan Doan
(74) *Attorney, Agent, or Firm* — Knobbe, Martens, Olson & Bear, LLP (57) ABSTRACT

Systems and method with regard to the routing of a client computing device DNS query within a content delivery network service provider domain as a function of additional request routing information embedded as parameters in messages transmitted as part of the DNS queries generated by, or on behalf of, the client computing device are provided. By parsing and processing all the received information, the CDN service provider may select components of a CDN network reflective of the additional request routing information.

22 Claims, 6 Drawing Sheets

REQUEST ROUTING UTILIZING ENCODED DNS-BASED MESSAGING PARAMETERS

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In other examples, a user can request video streaming content or audio streaming content from the content provider. In such embodiments, the user computing device can be referred to as a client computing device and the server computing device can be referred to as a content provider.

Content providers are generally motivated to provide requested content to client computing devices, often with consideration of efficient transmission of the requested content to the client computing device or consideration of a cost associated with the transmission of the content or delivery of the content services. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content, such as Web pages, resources identified in Web pages, streaming content, etc., through the utilization of a content delivery network ("CDN") service provider. A CDN service provider typically maintains a number of computing devices in a communication network that can maintain content from various content providers. In turn, content providers can instruct, or otherwise suggest to, client computing devices to request some, or all, of the content provider's content from the CDN service provider's computing devices. Upon receipt of resource requests from such client computing devices, a CDN service provider typically delivers the requested resource in accordance with terms (such via a service plan) specified between a corresponding content provider and the CDN service provider.

As with content providers, network storage providers and CDN service providers are also generally motivated to provide requested content to client computing devices often with consideration of efficient transmission of the requested content to the client computing device or consideration of a cost associated with the transmission of the content. Accordingly, CDN service providers often consider factors such as latency of delivery of requested content in order to meet service level agreements or to generally improve the quality of delivery service.

In an illustrative example, a CDN service provider may employ computing devices that are placed at selected locations within the communications network. Through placement of the computing devices, as well as the selection of content maintained by the computing devices, the CDN service provider may direct content requests to computing devices that possess sufficient capacity to respond or are relatively close to the requesting client computing devices. In this manner, the CDN service provider may achieve reductions in latency and better manage capacity, improving quality of service.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to routing of DNS queries from a client computing device corresponding to content requests that are performed by a network resource, such as content delivery network ("CDN") service providers. The processing of a DNS query by a CDN service provider is generally referred to generally as request routing. Specifically, aspects of the disclosure will be described with regard to the routing of a client computing device DNS query within a content delivery network service provider domain as a function of additional request routing information embedded as parameters in DNS-based messages transmitted as part of the DNS queries generated by, or on behalf of, the client computing device. Examples of the additional request routing information that can be embedded as parameters include workload identifiers and object identifiers as will be described in greater detail.

In certain embodiments, the additional request routing information may be included, embedded or otherwise encoded as parameters in DNS-based messages conforming to the extended mechanism for DNS ("EDNS") protocol. Generally described, the EDNS protocol is a general extension mechanism for DNS. EDNS specifies a general message format for encoding options, errors and name compression. The general message format for EDNS is specified in Internet Engineering Task Force ("IETF") RFC 2671, which is incorporated by reference herein. Although the IETF RFC 2671 describes a general message format for EDNS messages, RFC 2671 does not specify any specific types of parameters that can be encoded or uses for the embedded parameters, including encoding any parameters for purposes of requesting routing. In addition to the embedded additional request routing information (e.g., EDNS parameters), the CDN service provider can also obtain geographic information associated with the client device, DNS resolver components and request routing policy information.

By parsing and processing all the received information, the CDN service provider may select components of a CDN network reflective of the additional request routing information (e.g., request routing based at least in part on the embedded EDNS parameter information). For example, a CDN service provider may route DNS queries for content (as defined by object identifiers) to one or more particular point of presence location(s) that may have cached the requested resource previously (or would be appropriate to cache in a distributed system). In another example, CDN service provider may route DNS queries for content (as defined by workload identifiers) to one or more particular point of presence location(s) that may meet minimum resource or configuration requirements associated with the identified workload or that are otherwise optimized for a type or types of workloads. The CDN service provider can also utilize the location information and request routing policy information to select points of presence in consideration of multiple request routing criteria. Although various aspects of the disclosure will be described with regard to illustrative examples and embodiments, one skilled in the art will appreciate that the disclosed embodiments and examples should not be construed as limiting. Still further, although aspects of the present application will be described with regard to the EDNS protocol, aspects of the present application may be applicable to other forms of DNS-based messaging or variations of the EDNS protocol.

Figure 1:
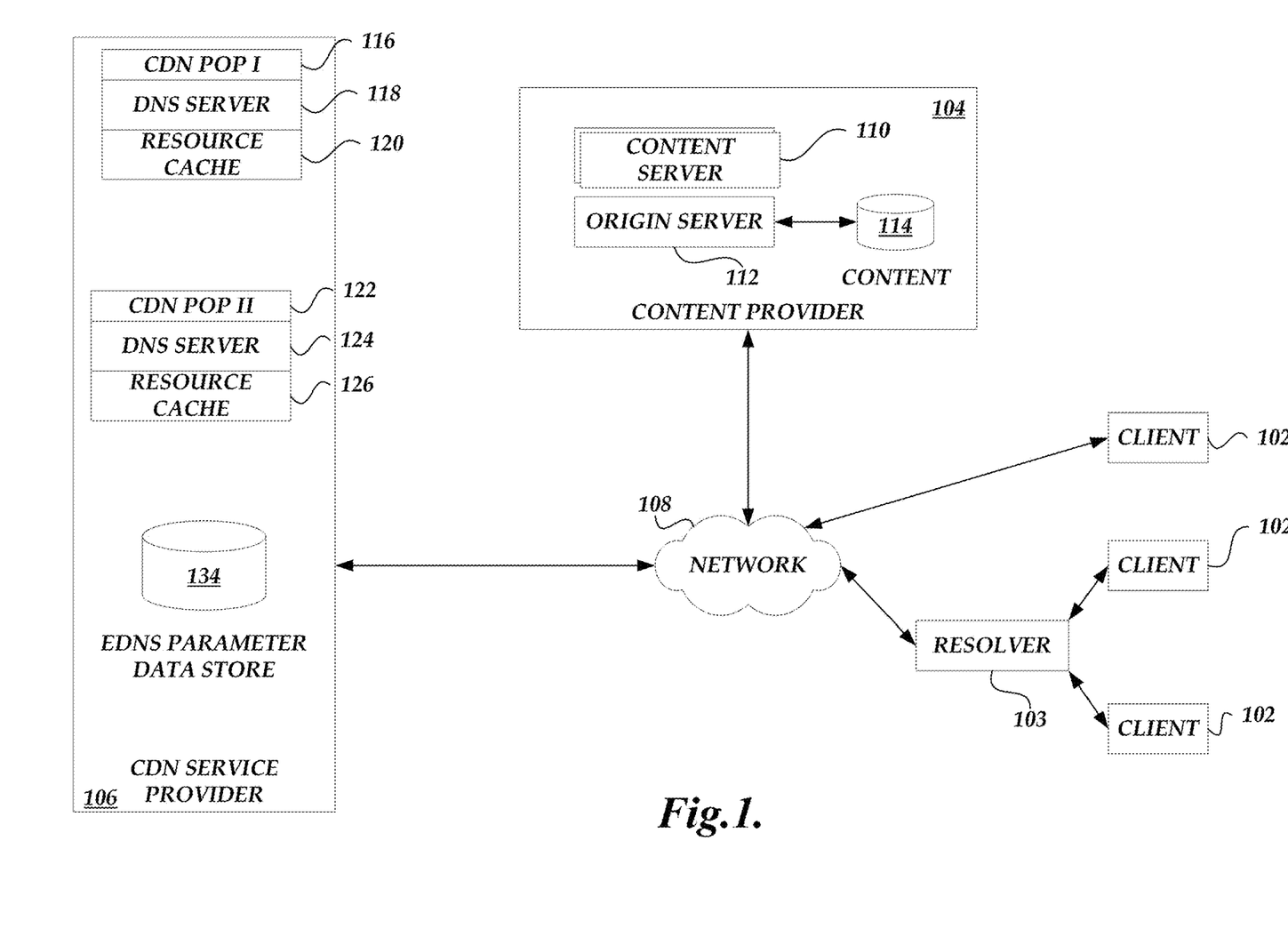
FIG. 1 is a block diagram illustrative of content delivery environment including a number of client computing devices, content provider, and a content delivery network service provider.

FIG. 1 is a block diagram illustrative of content delivery environment 100 for the management and processing of content requests. As illustrated in FIG. 1, the content delivery environment 100 may include a number of client computing devices 102 (generally referred to as clients) for requesting content from a content provider or a CDN service provider. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances, and the like. In an illustrative embodiment, the client computing devices 102 may include necessary hardware and software components for establishing communications over a communication network 108, such as a wide area network or local area network. For example, the client computing devices 102 may be equipped with networking equipment and browser software applications that facilitate communications via the Internet or an intranet.

As illustrated in FIG. 1, certain grouping of client computing devices 102 may utilize some type of local DNS resolver component 103, such as a DNS nameserver, that generates the DNS queries attributed to (or on behalf of) the client computing device 102. In one embodiment, the local DNS resolver component may be provided by an enterprise network to which the client computing device 102 belongs. In another embodiment, the local DNS resolver component may be provided by an Internet Service Provider (ISP) that provides the communication network connection to the client computing device 102. Illustratively, the DNS resolver component 103 provides some form of geographic identification information when transmitting DNS queries on behalf of client computing devices 102 that will be utilized in the request routing processing by the CDN service provider.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include one or more content components 110 corresponding to one or more server computing devices for obtaining and processing requests for content (such as Web pages, video content, audio content, etc.) from the client computing devices 102. The content provider 104 can further include an origin server component 112 and associated storage component 114 corresponding to one or more computing devices for obtaining and processing requests for network resources from the CDN service provider.

One skilled in the relevant art will appreciate that the content provider 104 can be associated with various additional computing resources, such additional computing devices for administration of content and resources, DNS nameservers, and the like. For example, although not illustrated in FIG. 1, the content provider 104 can be associated with one or more DNS nameserver components that receive DNS queries associated with the domain of the content provider 104 and that would be authoritative to resolve client computing device DNS queries corresponding to a domain of the content provider (e.g., return an IP address responsive to the DNS query). A DNS nameserver component is considered to be authoritative to a DNS query if the DNS nameserver can completely resolve the query by providing a responsive IP address. Additionally, the content provider 104 may omit some of the components illustrated in FIG. 1, such as origin server 112 or the content servers 110.

With continued reference to FIG. 1, the content delivery environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122 that correspond to nodes on the communication network 108. Individual POP 116, 122 illustratively includes a DNS component 118, 124 made up of a number of DNS nameserver computing devices for resolving DNS queries from the client computers 102. In other embodiments, one or more DNS nameserver components may be provided independent of the POP locations, such as hosted via a DNS nameserver service independent of the CDN service provider 106. Each POP 116, 122 also includes a resource cache component 120, 126 made up of a number of cache server computing devices or processing components for storing and providing resources from content providers and transmitting various requested resources to various client computers. The resource cache components 120, 126 may be associated with different computing device resources (e.g., physical computing devices or virtual computing devices) as well as different configurations of computing devices that function to provide content.

Still further, the CDN service provider 106 may include a EDNS information data store 134 for maintaining EDNS parameter information for request routing on behalf of one or more various content providers 104. The EDNS information data store 134 can include information identifying or defining various workload identifiers and POPs that have been associated with sufficient resources/configurations to satisfy a specification of workload identifier type, such as a look up table or database. The EDNS information data store 134 can also include information identify POPs that are currently caching or have been designated as primary caching sources for different object identifiers. In an illustrative embodiment, the EDNS information data store 134 may correspond to a central data store accessible by the POPs 116, 122, such as via a Web service. In another embodiment, each POP 116, 122 can maintain a local version of an EDNS information data store 134 for utilization in request routing as will be explained in greater detail. Additionally, although the EDNS information data store 134 is illustrated as a single data store, one skilled in the relevant art will appreciate that ENDS information data store 134 may correspond to one or more data stores which may be implemented in a distributed manner.

The DNS components 118, 124 and the resource cache components 120, 126 may further include additional software and/or hardware components that facilitate communications including, but not limited, load balancing or load sharing software/hardware components. In an illustrative embodiment, the DNS component 118, 124 and resource cache component 120, 126, are considered to be logically grouped, regardless of whether the components, or portions of the components, are physically separate. Additionally, although the POPs 116, 122 are illustrated in FIG. 1 as logically associated with the CDN provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

Figure 2:
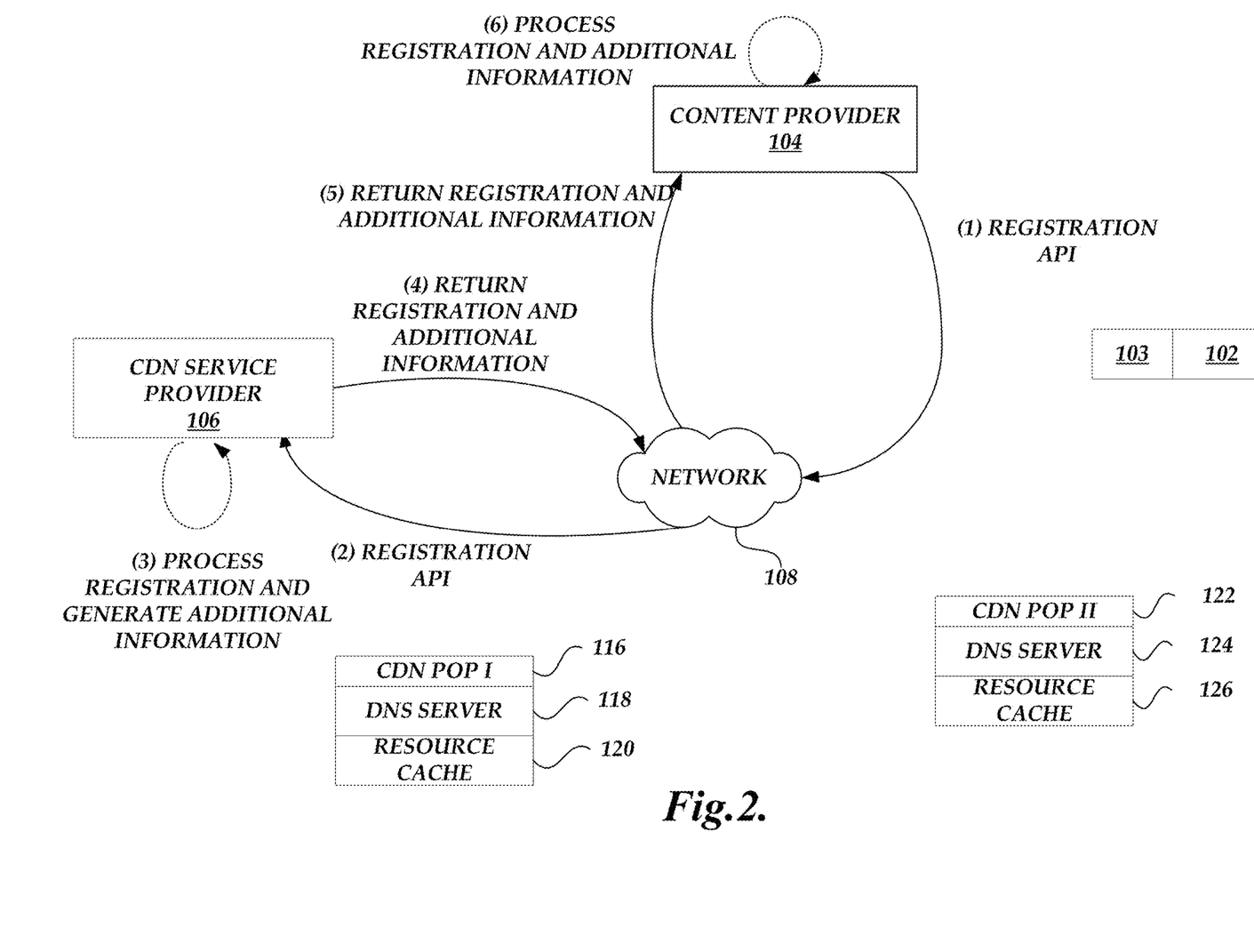
FIG. 2 is a block diagram of the content delivery environment of FIG. 1 illustrating the registration of a content provider with a content delivery service provider.

With reference now to FIG. 2, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 2, an illustrative interaction for registration of a content provider 104 with the CDN service provider 106 will be described. As illustrated in FIG. 2, the CDN content registration process begins at (1) and (2) with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106. Additionally, the registration API can further facilitate the specification of content provider, service levels, financial cost criteria, or other content provider specified criteria that can be utilized by the CDN service provider 106 in request routing processing.

One skilled in the relevant art will appreciate that upon identification of appropriate origin servers 112, the content provider 104 can begin to direct requests for content from client computing devices 102 to the CDN service provider 106. Specifically, in accordance with DNS routing principles, a client computing device request corresponding to a resource identifier would eventually be directed toward a POP 116, 122, 128 associated with the CDN service provider 106. In the event that the resource cache component 120, 126, 132 of a selected POP does not have a copy of a resource requested by a client computing device 102, the resource cache component will request the resource from the origin server 112 previously registered by the content provider 104.

With continued reference to FIG. 2, upon receiving the registration API, at (3), the CDN service provider 106 obtains and processes the registration information. In an illustrative embodiment, the CDN service provider 106 can then generate additional information that will be used by the client computing devices 102 as part of the DNS queries transmitted to the CDN service provider 106. The additional information can include, without limitation, workload type identifiers and object identifiers that will be embedded or included in EDNS messages. One skilled in the relevant art will appreciate that various types of additional information may be generated by the CDN service provider 106 and that the additional information may be embodied in any one of a variety of formats. In other embodiments, the CDN service provider 106 may provide the general format or information that a content provider 104 will use to generate the additional information. Still further, in other embodiments, one or more third parties may define one or more aspects of the embedded information encoding, such as a third party DNS service that specifies specific encoding parameters for use by the content provider 104 and CDN service provider 106. At (4) and (5), the CDN service provider 106 returns an identification of applicable domains for the CDN service provider (unless it has been previously provided) and any additional information to the content provider 104. In turn, the content provider 104 can then process the stored resource identifiers in accordance with the content provider specified information.

In one example, as illustrated in FIG. 2, at (6), the content provider 104 translates resource identifiers originally directed toward a domain of the origin server 112 to a domain corresponding to the CDN service provider. The modified URLs are embedded into requested content in a manner such that DNS queries for the modified URLs will resolve to a DNS server corresponding to the CDN service provider 106 and not a DNS nameserver corresponding to the content provider 104. Although the translation process is illustrated in FIG. 2, in some embodiments, the translation process may be omitted in a manner described in greater detail below.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provided, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the modified URLs resolve to a POP associated with the CDN service provider 106. In one embodiment, the modified URL identifies the domain of the CDN service provider 106 (e.g., "cdnprovider.com"), the same name of the resource to be requested (e.g., "resource.xxx") and the same path where the resource will be found (e.g., "path"). One skilled in the relevant art will appreciate that the name information and the path information is not accessible to a DNS nameserver as a part of DNS query processing. Accordingly, the portion of the URL including the domain and any preceding information is generally referred to as the "DNS portion" of the URL.

Additionally, the information provided by the CDN service provider 106 can include any additional information utilized by the CDN service provider 106 during the request routing information. As applied to the EDNS-based messages, the additional request routing information can include a specification of object identifiers that identify the requested resource (such as in a hash form) that is not otherwise visible in the DNS portion of the URL. The specification of object identifiers in EDNS messages would have the form of:

;; OPT PSEUDOSECTION:
EDNS: version: 0, flags: do; udp: 4096; *uri_hash* *:** E776950A8EEB757CEC0D5BB*

As applied to the EDNS-based messages, the additional request routing information can include a specification of workload identifiers that identify resource requirements or preferences that are otherwise part of the modified URL. The workload identifiers may be mapped to a set of configurable, pre-determined identifiers defined by the CDN service provider 106. The specification of object identifiers in EDNS messages would have the form of:

;; OPT PSEUDOSECTION:
EDNS: version: 0, flags: do; udp: 4096; *workload: LWM*

Illustratively, the modified URL and other requesting routing information may be limited to specifying workload identifiers, object identifiers or both. Still further, in accordance with the EDNS protocol, the embedded information is included as part of the DNS query message transmitted by a client computing device 102 and having the appropriate flags, settings and encoded information as described above or variations thereof. In other embodiments, such as with regard to other DNS-based messaging, the embedded additional information may be included as a separate message, in different configuration and the like. Additional EDNS parameters may also be included, such as for purposes other than request routing.

In another embodiment, the information associated with the CDN service provider 106 is included the modified URL, such as through prepending or other techniques, such that the modified URL can maintain all of the information associated with the original URL. In this embodiment, the modified URL would have the form of:

http://cdnprovider.com/www.contentprovider.com/path/resource.xxx

Figure 3A:
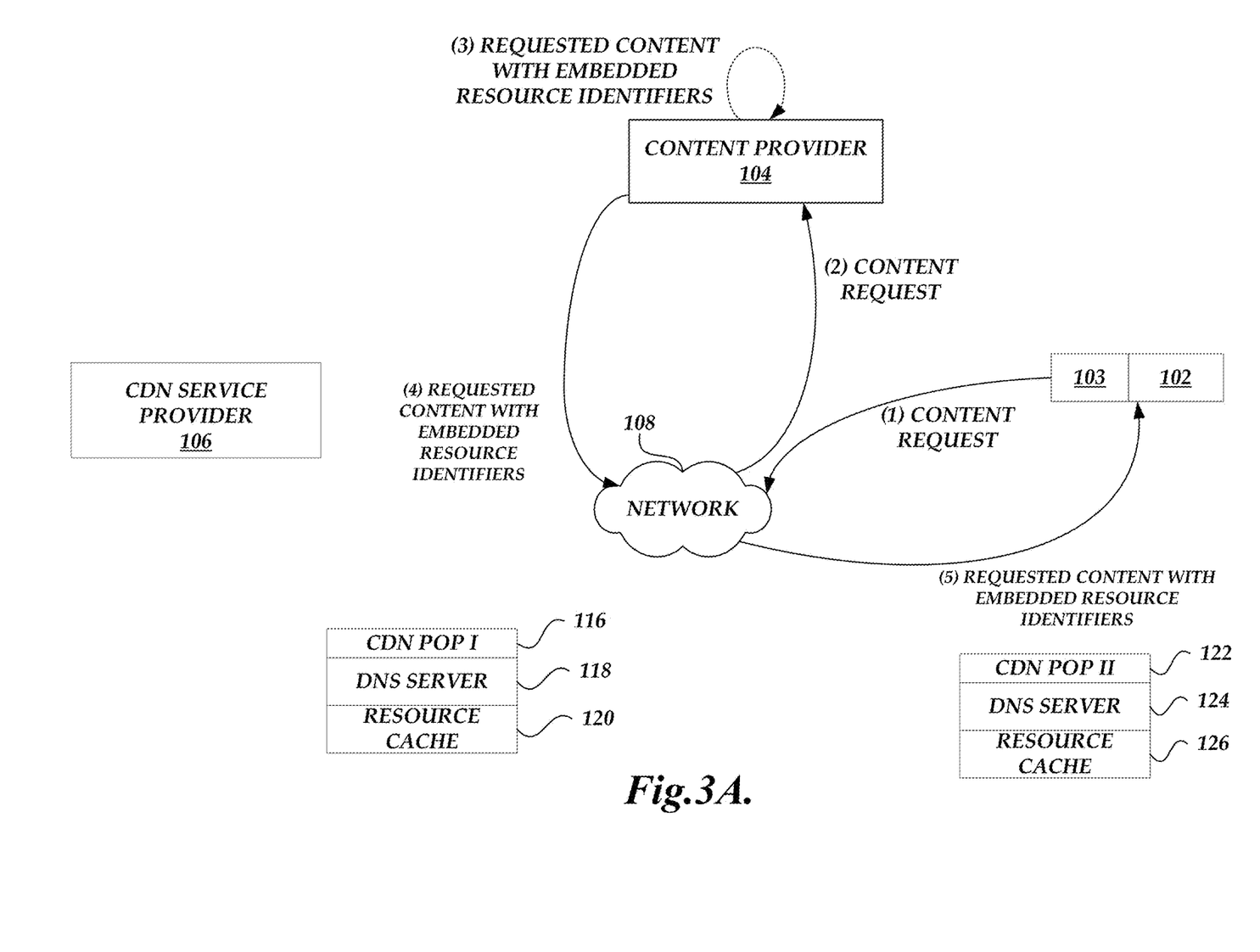
FIG. 3A is a block diagram of the content delivery environment of FIG. 1 illustrating the generation and processing of a content request from a client computing device to a content provider and delivery of content including embedded resource identifiers from the content provider to the client computing device.

With reference now to FIG. 3A, after completion of the registration and translation processes illustrated in FIG. 2, at (1) and (2), a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP").

Upon receipt of the content request, at (3), the content provider 104 identifies the appropriate responsive content. In an illustrative embodiment, the requested content can correspond to a Web page or service interface that is displayed on the client computing device 102 via the processing of information, such as hypertext markup language ("HTML"), extensible markup language ("XML"), and the like. The requested content can also include a number of embedded resource identifiers, described above, that correspond to resource objects that should be obtained by the client computing device 102 as part of the processing of the requested content. At (4) and (5) the requested content with embedded resource identifiers is returned to the client computing device 102.

In an embodiment, the embedded resource identifiers will generally be in the form of the modified URLs, described above. Alternatively, the embedded resource identifiers can remain in the form of the content provider URLs that would be received and processed by a DNS nameserver associated with the content provider 104. In this alternative embodiment, the receiving DNS nameserver would use a canonical name record ("CNAME") that would identify the network storage component 110. Upon receipt of the returned CNAME, the client computing device 102 subsequently transmits a DNS query corresponding to the received CNAME. The client computing device 102 can then process the received CNAME in a manner similar to the modified URLs, described below. For ease of illustration, however, the alternative embodiment will not be described in further detail and the additional processing steps will only be described with regard to the modified URL. One skilled in the relevant will appreciate that the below description may be applicable to CNAMEs as described in the alternative embodiment.

Upon receipt of the requested content containing modified URLs, the client computing device 102, such as through a browser software application or other network application, begins processing any of the markup code included in the content and attempts to acquire the resources identified by the embedded resource identifiers. Accordingly, the first step in acquiring the content correspond to the issuance, by the client computing device 102 (through its local DNS resolver), a DNS query for the modified URL resource identifier that results in the identification of a DNS nameserver authoritative to the "." and the "com" portions of the modified URL. After partially resolving the "." and "com" portions of the embedded URL, the client computing device 102 then issues another DNS query for the resource URL that results in the identification of a DNS nameserver authoritative to the ".cdnprovider" portion of the embedded URL. The issuance of DNS queries corresponding to the "." and the "com" portions of a URL are well known and have not been illustrated.

Figure 3B:
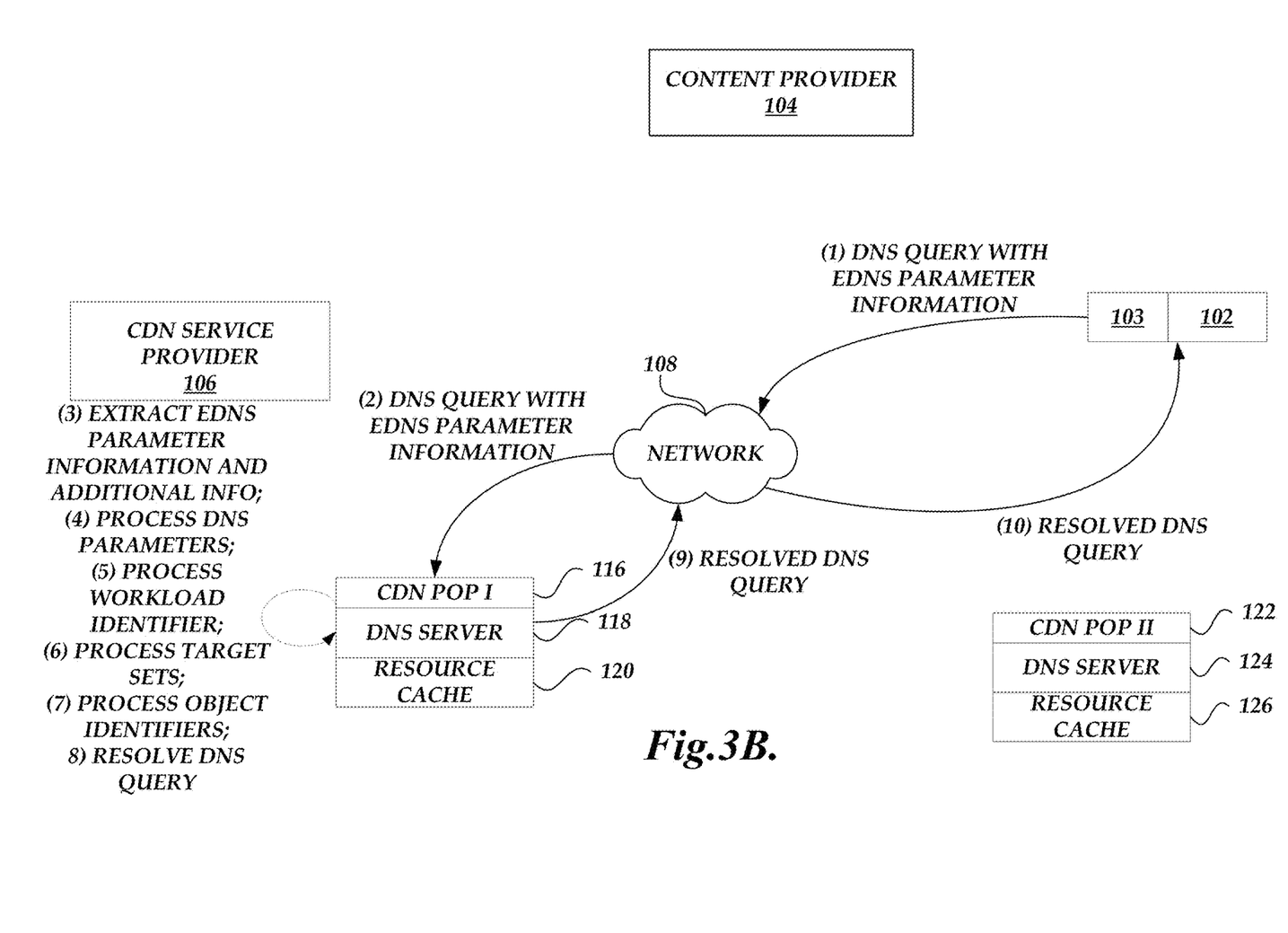
FIG. 3B is a block diagram of the content delivery environment of FIG. 1 illustrating the generation and processing of a DNS query including EDNS parameter information from a client computing device to a content delivery network service provider.

With reference now to FIG. 3B, in an illustrative embodiment, the successful resolution of the "cdnprovider" portion of the original URL identifies a network address, such as an IP address, of a DNS nameserver associated with the CDN service provider 106. In one embodiment, the IP address is a specific network address unique to a DNS nameserver component of a POP. In another embodiment, the IP address can be shared by one or more POPs. In this embodiment, a further DNS query to the shared IP address utilizes a one-to-many network routing schema, such as anycast, such a specific POP will receive the request as a function of network topology. For example, in an anycast implementation, a DNS query issued by a client computing device 102 to a shared IP address will arrive at a DNS nameserver component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP.

With continued reference to FIG. 3B, at (1) and (2), a specific DNS nameserver in the DNS component 118 of a POP 116 receives the DNS query corresponding to the original URL from the client computing device 102. Once one of the DNS nameservers in the DNS component 118 receives the request, the specific DNS nameserver attempts to resolve the request. In an illustrative embodiment, a specific DNS nameserver can resolve the DNS query by identifying an IP address of a cache server component that will process the request for the requested resource. As described above, a selected resource cache component can process the request by either providing the requested resource if it is available or attempt to obtain the requested resource from another source, such as a peer cache server computing device or the origin server 112 of the content provider 104.

As an alternative to selecting a cache server component, the CDN service provider 106 can maintain sets of various alternative resource identifiers. The alternative resource identifiers can be provided by the CDN service provider 106 to the client computing device 102 such that a subsequent DNS query on the alternative resource identifier will resolve to a different DNS nameserver component within the CDN service provider's network. In an illustrative embodiment, the alternative resource identifiers are in the form of one or more CNAME records. In one embodiment, each CNAME record identifies a domain of the CDN service provider 106 (e.g., "cdnprovider.com" or "cdnprovider-1.com"). The domain in the CNAME does not need to be the same domain found in original URL or in a previous CNAME record. In a manner similar to the information described above, each CNAME record includes the same or different additional information utilized by a receiving DNS nameserver for processing the DNS query (e.g., the additional information).

In an illustrative embodiment, the additional request routing information included in the EDNS based message transmitted with DNS query can include two types of information. The first type of information includes object identifier that can identify, at least in part, the object or resource that will be requested by the client device 102 once the DNS query is resolved. The identification of the object or resource is not generally available during the DNS query resolution process from the modified URL. The object identifier can be in the form of a hash or other unique representation, such as a hash generated by a consistent hashing algorithm. The second type of information in the EDNS message can include workload identifiers that can identify cache server resource requirements or configurations, special processing requirements that can be used to identify POPs that can provide the necessary or recommended processing capabilities. The workload identifiers can be manually defined and managed by the CDN service provider 106 as a set of predefined classes or classifications. The workload identifiers can represent a designation of the minimal requirements that must be satisfied by the selected POP component. In other embodiments, the workload identifiers can represent recommended or optional values that should be attempted to be satisfied by the selected POP component. Any given EDNS message can include multiple workload identifiers. Additionally, a DNS nameserver 118 can apply request routing policies that may prioritize other criteria even when designated as requirements.

In the embodiment illustrated in FIG. 3B, the CDN service provider 106 utilizes the additional request routing information, at least in part, to identify a more appropriate cache that can be responsive to subsequently issued content requests by the client computing device 102. At (3), the DNS nameserver 118 extracts the EDNS parameter information and obtains any additional information included with or derived from the DNS query. As described above, the DNS nameserver 118 can utilize the flag structure of the EDNS parameter information to determine object identifiers and workload identifiers. The DNS nameserver 118 can further get location information or geographic criteria from the DNS resolver 103 or client device 102. The DNS nameserver 118 can also obtain or recall additional request routing policy information. Such policy information can illustratively include financial criteria, network performance criteria (e.g., latency), POP capacity criteria, or various rules or weights that will be applied to the various criteria.

At (4), the DNS nameserver 118 can attempt to identify a first set of target POPs according to geographic criteria. The geographic criteria can correspond to geographic identifier specifically associated with the client computing device 102 or the DNS resolver 103. The first set of target POPs can be based on logical or physical proximity to a reference point (e.g., the client computing device 102). The first set of target POPs can also be based on geographic-based regional service plans contracted between the CDN service-provider 106 and the content provider 104 in which various CDN service provider 106 POPs are grouped into geographic regions. Accordingly, a client computing device 102 DNS query received in a region not corresponding to the content provider's regional plan may be better processed by a DNS nameserver in region corresponding to the content provider's regional plan. In this example, the DNS nameserver component 118 may also obtain geographic information from the client directly (such as information provided by the client computing device or ISP) or indirectly (such as inferred through a client computing device's IP address).

At (5), the DNS nameserver 118 can attempt to identify a second set of target POPs according to extracted workload identifiers. Illustratively, the DNS nameserver 118 can utilized the EDNS data store 134 to identify workload identifiers and POPs that can be associated with or have been determined to be compatible with the extract workload identifiers. In an alternative embodiment, the DNS nameserver 118 can identify the attributes specified for the workload identifier and compare those attributes with the attributes/characteristics of the known, available POPs in real-time or semi-real time.

At (6), the DNS nameserver 118 can process the two formed sets of target POPS. Illustratively, the DNS nameserver 118 will merge the two set of target POPs previously created, such as by applying request routing policy information to determine the priority between geographic criteria, workload identifiers and any additional criteria identified in the request routing policy. In one example, the CDN service provider 106 may determine that requests for highly popular resources should be handled by one or more POPs (e.g., POPs 116, 122) according to geographic or network topology, such as POPs that are located on the edge of the content delivery network. Accordingly, the first set of target POPs (e.g., geographic criteria) may have a higher priority or greater influence.

In other embodiments, the CDN service provider 106 may prioritize requests for highly popular resources among one or more POPs (e.g., POPs 116, 122) that possess a high level of resource availability meeting the requirements for the workload identifiers. For example, for highly popular resources requiring above average computation, delays in responding to requests for the resource may arise due to limitations in processing resources at specific POPs. Thus, by utilizing alternative resource identifiers to distribute requests to any POPs having high resource availability, latency due to insufficient computing resources may be reduced. Accordingly, the second set of target POPs (e.g., workload identifiers) may have a higher priority or greater influence.

Still further, the DNS nameserver 118 can utilize the additional information to select determine a priority, influence or relevance of the merged set of target POPs as identified in the request routing policy including, but are not limited to, financial cost to content provider 104, network performance (e.g., "internet weather") service level criteria, content provider specified, etc. For example, the DNS nameserver 118 can attempt to prioritize POPs according to network performance criteria in addition to geographic or workload criteria (which may or may be given equal weight). The network performance criteria can correspond to measurements of network performance for transmitting data from the CDN service provider POPs to the client computing device 102. Examples of network performance metrics can include network data transfer latencies (measured by the client computing device or the CDN service provider 106, network data error rates, and the like. In another example, the DNS nameserver 118 can determine that financial cost information specified by the content provider 104 in terms of a cost attributed to the content provider by the CDN service provider 106 can take a higher priority over the workload identifier or geographic criteria and that the DNS query should be resolved with financial cost information having a greater influence or weight. The financial cost information may be partially influenced by the workload identifier information such that a type of processing/resource (e.g., the workload identifier) is also attributed a cost by the CDN service provider 106 and is used as a priority mechanism for the merger of sets of target POPs.

At (7), the DNS nameserver 118 can utilize object identifiers against the merged and processed set of target POPs. Illustratively, with a consistent hashing algorithm, the DNS nameserver 118 can maintain tables of POPs that are known to have a current copy of the resource in cache memory. Accordingly, the DNS nameserver 118 would then reorder or filter the merged list based on the object identifier. In other embodiments, with a consistent hashing algorithm, the caching of resources may be assigned, at least in part, based on the hash values. In this example, the DNS nameserver 118 may further merge or map POPs that are likely to cache the requested resource or have been otherwise assigned to cache.

At (8), the DNS nameserver 118 resolves the DNS query by selecting one or more IP addresses of the POPs. In some embodiments, the DNS nameserver 118 can provide a filtered list or sorted list of IP addresses. Illustratively, the request routing policy can include the selection criteria or configuration in terms of the number of IP addresses to return and the like. At (9) and (10), the resolved DNS query is transmitted back to the DNS resolver 103/client computing device 102.

Figure 3C:
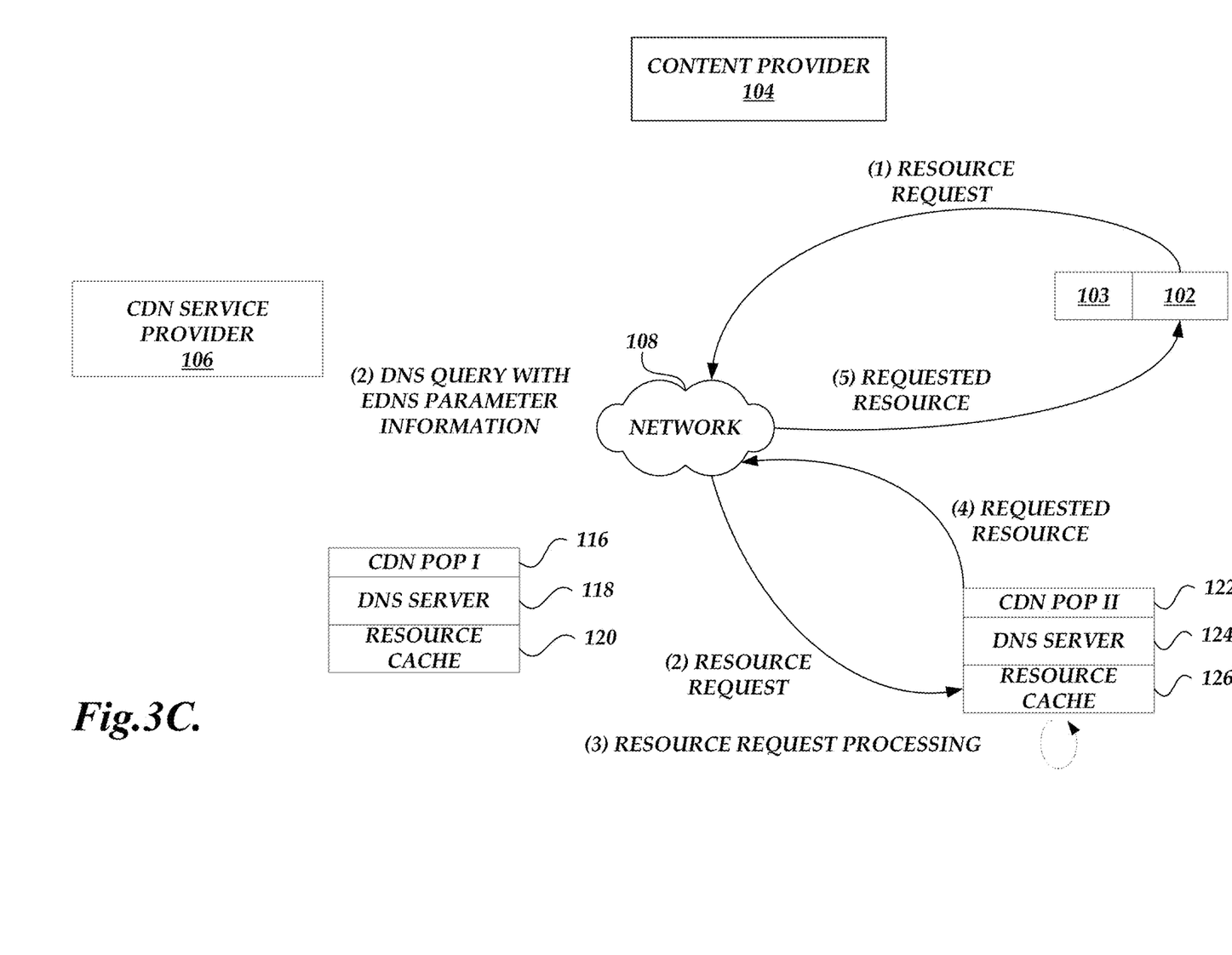
FIG. 3C is a block diagram of the content delivery environment of FIG. 1 illustrating the generation and processing of resource requests from a client computing device to a content delivery network service provider.

With reference now to FIG. 3E, in an illustrative example, assume that the DNS nameserver component 118 has resolved to received DNS query by returning the IP address of the resource cache component 126 of POP 122. Upon receipt of the IP address for the resource cache component 126, the client computing device 102 transmits requests for the requested content to the resource cache component 126 at (1) and (2). At (3), the resource cache component 132 processes the request in accordance with the type of content and communication protocol. For example, a content request may be generated in accordance with the hypertext transfer protocol ("HTTP"). In another example, a streaming content request may be generated in accordance with the dynamic live streaming ("DLS") protocol. At (4) and (5), cache component 126 the requested resource is transmitted to the client computing device 102 in accordance with one or more communication protocols. Although it may be possible for the subsequent content requests to hand off content request, such as via HTTP redirects, the availability of the additional request routing information in the EDNS messages increases the likelihood that the resolved DNS query will be able to service the content request. This facilitates increased efficiencies for the CDN service provider.

Figure 4:
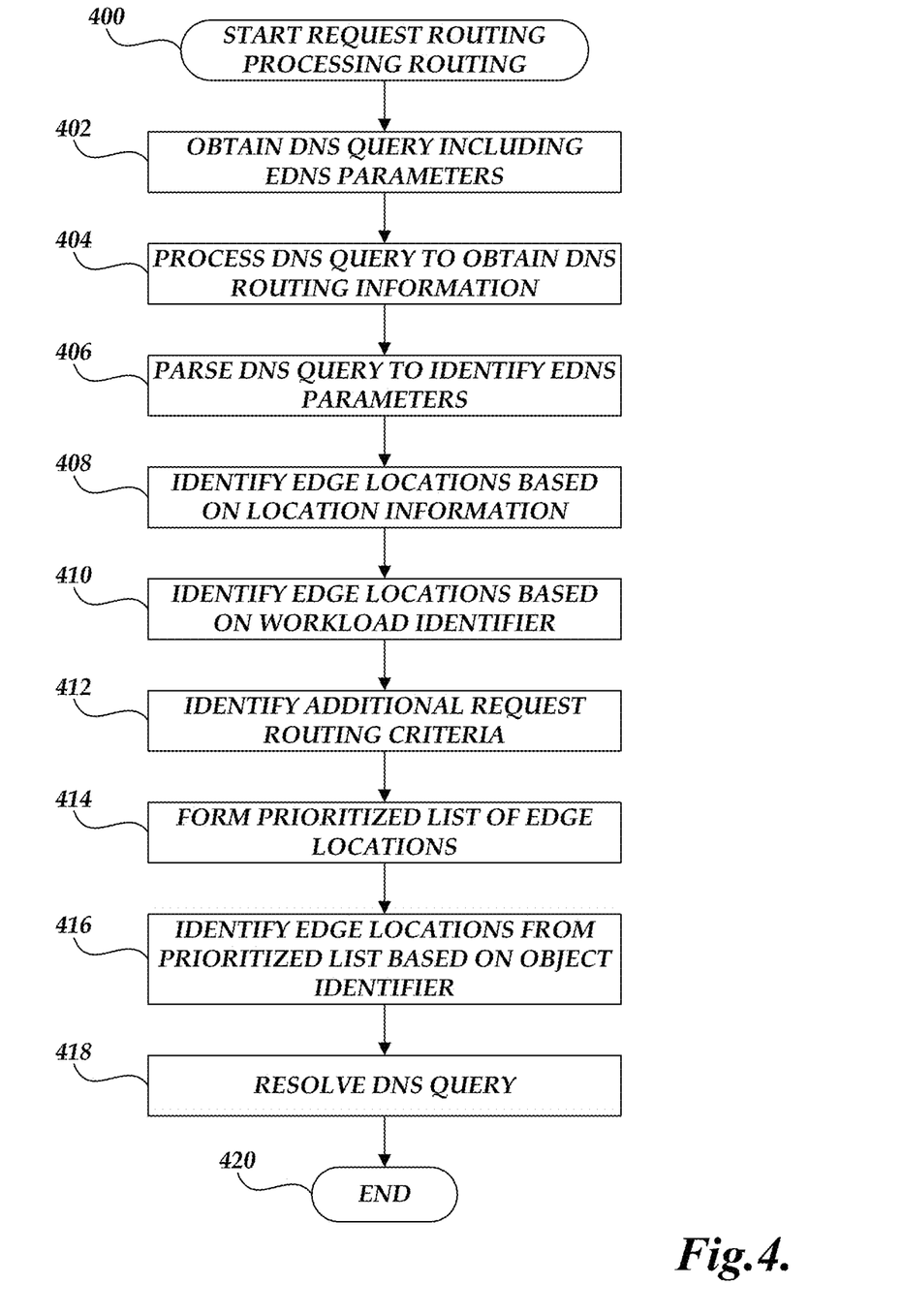
FIG. 4 is a flow diagram illustrative of an illustrative request routing routine implemented by a content delivery network service provider for selecting a cache server or network computing component utilizing EDNS parameter information.

With reference now to FIG. 4, an embodiment of a request routine 400 implemented by the CDN provider 106 will be described. One skilled in the relevant art will appreciate that actions/steps outlined for routine 400 may be implemented by one or many computing devices/components that are associated with the CDN service provider 106, such as DNS nameserver. Accordingly, routine 400 has been logically associated as being performed by the CDN service provider 106 for simplicity.

At block 402, at (1) and (2), a specific DNS nameserver in the DNS component 118 of a POP 116 receives the DNS query corresponding to the original URL from the client computing device 102. Once one of the DNS nameservers in the DNS component 118 receives the request, the specific DNS nameserver attempts to resolve the request. In an illustrative embodiment, a specific DNS nameserver can resolve the DNS query by identifying an IP address of a cache server component that will process the request for the requested resource. As described above, a selected resource cache component can process the request by either providing the requested resource if it is available or attempt to obtain the requested resource from another source, such as a peer cache server computing device or the origin server 112 of the content provider 104.

In an illustrative embodiment, the additional request routing information included in the EDNS based message transmitted with DNS query can include two types of information. The first type of information includes object identifier that can identify, at least in part, the object or resource that will be requested by the client device 102 once the DNS query is resolved. The identification of the object or resource is not generally available during the DNS query resolution process from the modified URL. The object identifier can be in the form of a hash or other unique representation, such as a hash generated by a consistent hashing algorithm. The second type of information in the EDNS message can include workload identifiers that can identify cache server resource requirements or configurations, special processing requirements that can be used to identify POPs that can provide the necessary or recommended processing capabilities. The workload identifiers can be manually defined and managed by the CDN service provider 106 as a set of predefined classes or classifications. The workload identifiers can represent a designation of the minimal requirements that must be satisfied by the selected POP component. In other embodiments, the workload identifiers can represent recommended or optional values that should be attempted to be satisfied by the selected POP component. Any given EDNS message can include multiple workload identifiers. Additionally, a CDN service provider 106 can apply request routing policies that may prioritize other criteria even when designated as requirements.

At block 404, the CDN service provider 106 processes the DNS query to obtain DNS routing information. Illustratively, the CDN service provider 106 can get location information or geographic criteria from the DNS resolver 103 or client device 102, which is typically transmitted in the request. The CDN service provider 106 can also obtain or recall additional request routing policy information. Such policy information can illustratively include financial criteria, network performance criteria (e.g., latency), POP capacity criteria, or various rules or weights that will be applied. At block 406, the CDN service provider 106 extracts the EDNS parameter information and obtains any additional information included with or derived from the DNS query. As described above, the DNS nameserver 118 can utilize the flag structure of the EDNS parameter information to determine object identifiers and workload identifiers. to the various criteria.

At block 408, the CDN service provider 106 can attempt to identify a first set of target POPs according to geographic criteria. The geographic criteria can correspond to geographic identifier specifically associated with the client computing device 102 or the DNS resolver 103. The first set of target POPs can be based on logical or physical proximity to a reference point (e.g., the client computing device 102). The first set of target POPs can also be based on geographic-based regional service plans contracted between the CDN service-provider 106 and the content provider 104 in which various CDN service provider 106 POPs are grouped into geographic regions. Accordingly, a client computing device 102 DNS query received in a region not corresponding to the content provider's regional plan may be better processed by a DNS nameserver in region corresponding to the content provider's regional plan. In this example, the CDN service provider 106 may also obtain geographic information from the client directly (such as information provided by the client computing device or ISP) or indirectly (such as inferred through a client computing device's IP address).

At block 410, the CDN service provider 106 can attempt to identify a second set of target POPs according to extracted workload identifiers. Illustratively, the CDN service provider 106 can utilized the EDNS data store 134 to identify workload identifiers and POPs that can be associated with or have been determined to be compatible with the extract workload identifiers. In an alternative embodiment, the CDN service provider 106 can identify the attributes specified for the workload identifier and compare those attributes with the attributes/characteristics of the known, available POPs in real-time or semi-real time.

At block 412 and 414, the CDN service provider 106 can recall the routing policy information and process the two formed sets of target POPS. Illustratively, the CDN service provider 106 will merge the two set of target POPs previously created, such as by applying request routing policy information to determine the priority between geographic criteria, workload identifiers and any additional criteria identified in the request routing policy. In one example, the CDN service provider 106 may determine that requests for highly popular resources should be handled by one or more POPs (e.g., POPs 116, 122) according to geographic or network topology, such as POPs that are located on the edge of the content delivery network. Accordingly, the first set of target POPs (e.g., geographic criteria) may have a higher priority or greater influence.

In other embodiments, the CDN service provider 106 may prioritize requests for highly popular resources among one or more POPs (e.g., POPs 116, 122) that possess a high level of resource availability meeting the requirements for the workload identifiers. For example, for highly popular resources requiring above average computation, delays in responding to requests for the resource may arise due to limitations in processing resources at specific POPs. Thus, by utilizing alternative resource identifiers to distribute requests to any POPs having high resource availability, latency due to insufficient computing resources may be reduced. Accordingly, the second set of target POPs (e.g., workload identifiers) may have a higher priority or greater influence.

Still further, the CDN service provider 106 can utilize the additional information to select determine a priority, influence or relevance of the merged set of target POPs as identified in the request routing policy including, but are not limited to, financial cost to content provider 104, network performance (e.g., "internet weather") service level criteria, content provider specified, etc. For example, the CDN service provider 106 can attempt to prioritize POPs according to network performance criteria in addition to geographic or workload criteria (which may or may be given equal weight). The network performance criteria can correspond to measurements of network performance for transmitting data from the CDN service provider POPs to the client computing device 102. Examples of network performance metrics can include network data transfer latencies (measured by the client computing device or the CDN service provider 106, network data error rates, and the like.

At block 416, the CDN service provider 106 can utilize object identifiers against the merged and processed set of target POPs. Illustratively, with a consistent hashing algorithm, the DNS nameserver 118 can maintain tables of POPs that are known to have a current copy of the resource in cache memory. Accordingly, the CDN service provider 106 would then reorder or filter the merged list based on the object identifier. In other embodiments, with a consistent hashing algorithm, the caching of resources may be assigned, at least in part, based on the hash values. In this example, the CDN service provider 106 may further merge or map POPs that are likely to cache the requested resource or have been otherwise assigned to cache.

At block 418, the CDN service provider 106 resolves the DNS query by selecting one or more IP addresses of the POPs. In some embodiments, the CDN service provider 106 can provide a filtered list or sorted list of IP addresses. Illustratively, the request routing policy can include the selection criteria or configuration in terms of the number of IP addresses to return and the like. At block 420, the routine 400 terminates.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing resource requests comprising:
   obtaining a DNS query for a requested resource, wherein the DNS query is associated with a client computing device, and with a DNS-based message including encoded object identifier information and encoded workload identifier information;
   determining location information regarding the requested resource;
   parsing the DNS query to identify the encoded object identifier information and the encoded workload identifier information, wherein the encoded object identifier information identifies a first plurality of target resource sources that store the requested resource in corresponding memory, and wherein the encoded workload identifier information identifies minimal processing capabilities to process the DNS query;
   obtaining request routing policy information, wherein the request routing policy information identifies routing criteria for the DNS query based at least in part on a characteristic of the DNS query;
   determining, based at least in part on the request routing policy information, a priority of the location information with respect to the encoded workload identifier information;
   forming a combined set of target resource sources based at least in part on the priority of the location information with respect to the encoded workload identifier information;
   filtering the combined set of target resource sources based at least in part on the encoded object identifier information to generate a filtered set of target resource sources, wherein the filtered set of target resource sources identifies a second plurality of target resource sources of the combined set of target resource sources that store the requested resource in corresponding memory; and
   resolving the DNS query from the client computing device based at least in part on a selection from the filtered set of target resource sources and the priority of the location information with respect to the encoded workload identifier information.

2. The computer-implemented method of claim 1, wherein the encoded workload identifier information corresponds to an identification of a pre-determined set of workload classes.

3. The computer-implemented method of claim 2, wherein the pre-determined set of workload classes are manually specified by a content delivery network service provider.

4. The computer-implemented method of claim 2, wherein the pre-determined set of workload classes are manually specified by a service provider independent of a content delivery network service provider.

5. The computer-implemented method of claim 1, wherein the encoded object identifier information corresponds to a consistent hash.

6. The computer-implemented method of claim 1, wherein forming the combined set of target resource sources comprises:
   comparing the location information and first information associated with target resource sources to form a first set of target resource sources based at least in part on processing the location information, and wherein at least one target resource source of the first set of target resource sources is within a logical proximity of the client computing device;
   comparing the encoded workload identifier information and second information associated with the target resource sources to form a second set of target resource sources based at least in part on processing the encoded workload identifier information, and wherein at least one target resource source of the second set of target resource sources satisfies the minimal processing capabilities to process the DNS query; and
   merging and prioritizing the first set of target resource sources and the second set of target resource sources based at least in part on the priority of the location information with respect to the encoded workload identifier information to form the combined set of target resource sources.

7. The computer-implemented method of claim 6, wherein the request routing policy information includes information indicating a priority of the minimal processing capabilities with respect to the logical proximity to the client computing device.

8. The computer-implemented method of claim 6, wherein the request routing policy information includes additional criteria independent of criteria forming the first set of target resources sources or the second set of target resource sources.

9. The computer-implemented method of claim 8, wherein the additional criteria includes at least one of financial criteria, network performance criteria or service level criteria.

10. The computer-implemented method of claim 1, wherein resolving the DNS query from the client computing device based at least in part on the selection from the filtered set of target resource sources and the priority of the location information with respect to the encoded workload identifier information comprises selecting a target resource source from the filtered set of target resource sources based at least in part on the request routing policy information.

11. A computer-implemented method for managing resource requests comprising:
   responsive to a DNS query, determining location information regarding a requested resource;
   parsing the DNS query to identify object identifier information and workload identifier information, wherein the object identifier information identifies a first plurality of target resource sources that store the requested resource in corresponding memory, and wherein the workload identifier information identifies minimal processing capabilities to process the DNS query;
   obtaining request routing policy information, wherein the request routing policy information identifies routing criteria for the DNS query based at least in part on a characteristic of the DNS query;
   determining, based at least in part on the request routing policy information, a priority of the location information with respect to the workload identifier information;
   forming and filtering a combined set of target resource sources based at least in part on the priority of the location information with respect to the workload identifier information and based at least in part on the object identifier information to generate a filtered set of target resource sources, wherein the filtered set of target resource sources identifies a second plurality of target resource sources of the combined set of target resource sources that store the requested resource in corresponding memory; and
   resolving the DNS query from a client computing device based at least in part on a selection from the filtered set of target resource sources and the priority of the location information with respect to the workload identifier information.

12. The computer-implemented method of claim 11, wherein the workload identifier information corresponds to an identification of a pre-determined set of workload classes.

13. The computer-implemented method of claim 11, wherein forming the combined set of target resource sources comprises:
   comparing the location information and first information associated with target resource sources to form a first set of target resource sources based at least in part on processing the location information, and wherein at least one target resource source of the first set of target resource sources is within a logical proximity of the client computing device;
   comparing the workload identifier information and second information associated with the target resource sources to form a second set of target resource sources based at least in part on processing the workload identifier information, and wherein at least one target resource source of the second set of target resource sources satisfies the minimal processing capabilities to process the DNS query; and
   merging and prioritizing the first set of target resource sources and the second set of target resource sources based at least in part on the priority of the location information with respect to the workload identifier information to form the combined set of target resource sources.

14. The computer-implemented method of claim 13, wherein the request routing policy information includes at least one of information indicating a priority of the minimal processing capabilities with respect to the logical proximity to the client computing device or additional criteria independent of the object identifier information and the workload identifier information.

15. The computer-implemented method of claim 14, wherein the additional criteria includes at least one of financial criteria, network performance criteria or service level criteria.

16. The computer-implemented method of claim 11, wherein resolving the DNS query from the client computing device based at least in part on the selection from the filtered set of target resource sources and the priority of the location information with respect to the workload identifier information comprises selecting a target resource source from the filtered set of target resource sources based at least in part on the request routing policy information.

17. A system for processing resource requests comprising:
   a first network point of presence associated with a content delivery network service provider, wherein the first network point of presence includes a first DNS nameserver component that receives a DNS query from a client computing device for a requested resource, wherein the DNS query includes DNS-based message information including encoded object identifier information and encoded workload identifier information, and wherein the first network point of presence is operable to at least:
      determine location information regarding the requested resource;
      parse the DNS query to identify the encoded object identifier information and the encoded workload identifier information, wherein the encoded object identifier information identifies a first plurality of target resource sources that store the requested resource in corresponding memory, and wherein the encoded workload identifier information identifies minimal processing capabilities to process the DNS query;
      compare the location information and first information associated with target resource sources to form a first set of target resource sources associated with a second point of presence based at least in part on processing the location information, wherein the second point of presence is associated with the content delivery network service provider, and wherein at least one target resource source of the first set of target resource sources is within a logical proximity of the client computing device;
      compare the encoded workload identifier information and second information associated with the target resource sources to form a second set of target resource sources associated with a third point of presence based at least in part on processing the encoded workload identifier information, wherein the third point of presence is associated with the content delivery network service provider, and wherein at least one target resource source of the second set of target resource sources satisfies the minimal processing capabilities to process the DNS query;

obtain request routing policy information, wherein the request routing policy information identifies routing criteria for the DNS query based at least in part on a characteristic of the DNS query;

determine, based at least in part on the request routing policy information, a priority of the first set of target resource sources with respect to the second set of target resource sources;

merge and prioritize the first set of target resource sources and the second set of target resource sources based at least in part on the priority of the first set of target resource sources with respect to the second set of target resource sources to form a combined set of target resource sources;

filter the combined set of target resource sources based at least in part on the encoded object identifier information to generate a filtered set of target resource sources, wherein the filtered set of target resource sources identifies a second plurality of target resource sources of the combined set of target resource sources that store the requested resource in corresponding memory; and resolve the DNS query from the client computing device based at least in part on a selection from the filtered set of target resource sources and the priority of the first set of target resource sources with respect to the second set of target resource sources.

18. The system of claim 17, wherein the encoded workload identifier information corresponds to an identification of a pre-determined set of workload attributes.

19. The system of claim 17, wherein the encoded object identifier information corresponds to a consistent hash.

20. The system of claim 17, wherein the request routing policy information includes information indicating a priority of the minimal processing capabilities with respect to the logical proximity to the client computing device.

21. The system of claim 17, wherein the request routing policy information includes additional criteria independent of criteria forming the first set of target resource sources or the second set of target resource sources.

22. The system of claim 17, wherein the DNS query corresponds to an extended DNS protocol and wherein the encoded object identifier information and the encoded workload identifier information correspond to encoded parameters in accordance with the extended DNS protocol.

* * * * *